Patented Mar. 17, 1931

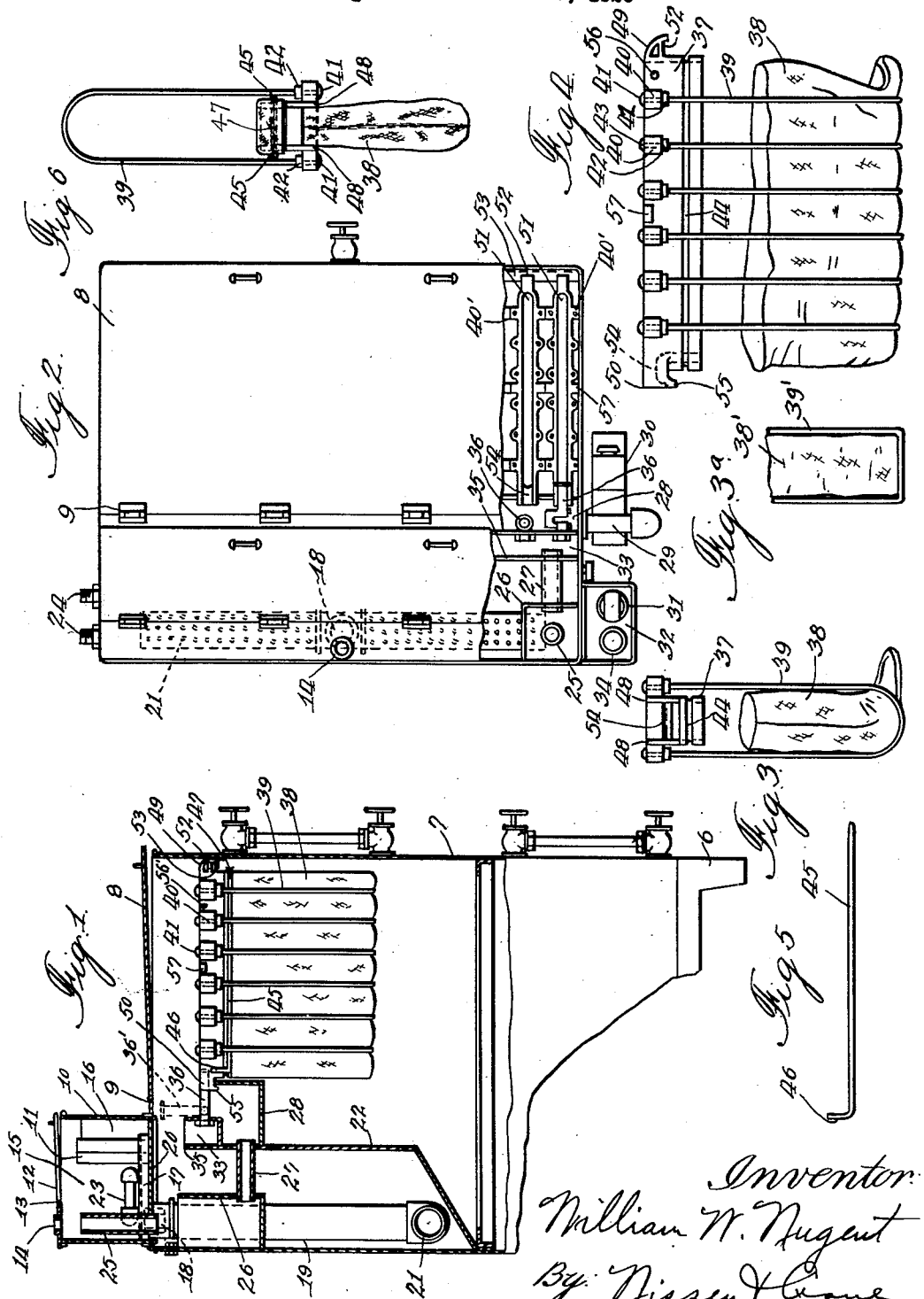

1,796,532

UNITED STATES PATENT OFFICE

WILLIAM W. NUGENT, OF CHICAGO, ILLINOIS

FILTER ELEMENT

Original application filed June 30, 1924, Serial No. 723,158. Divided and this application filed October 18, 1926, Serial No. 142,241. Renewed November 4, 1929.

The present invention relates to filter elements particularly adapted for use in filtering apparatus for filtering oil but may have a general application.

This application is a division of my co-pending application, Serial No. 723,158, filed June 30, 1924, for an improvement in filtering apparatus.

One of the objects of the present invention is the provision of improved means for securing a filter bag to a frame in a filter element.

A further object of the invention is the provision of an improved supporting frame to support and protect a filter bag mounted in such frame.

A further object of the invention is the provision of key mechanism for securing a filter bag to a supporting frame.

Another object of the invention is the provision of a plurality of supporting and protecting loops for a filter bag mounted within such loops.

Other objects of the invention will appear hereinafter, the novel features and combinations being set forth in the appended claims.

In the accompanying drawings—

Fig. 1 shows my improved filter element mounted in oil filtering apparatus of the type shown in my co-pending application, Serial No. 723,158, filed June 30, 1924;

Fig. 2 is a plan view of the filtering apparatus shown in Fig. 1 with a portion broken away at one end to illustrate in plan a plurality of filtering elements with spacing means thereon;

Fig. 3 is an end elevational view showing the filter bag detached from the upper frame;

Fig. 3ª shows a modification;

Fig. 4 is a side elevational view of the construction shown in Fig. 3 showing the filter bag within the loops but detached from the upper frame;

Fig. 5 illustrates one of the keys which is adapted to co-operate with means for locking the bag to the upper elongated frame; and Fig. 6 shows the filter element inverted with the bag turned inside out in position for cleaning.

Referring to Figs. 1 and 2 of the drawings, 6 designates a base on which an oil tank 7 is mounted. This oil tank is provided on its upper side with a hinged cover 8 hinged at 9. Back of the cover 8 is an upper elongated receiving tank 10 which is provided with an upright filter wall 11. The upper tank is provided with a cover 12 hinged at 13. Back of the cover 12 is located an inlet port 14. The oil to be filtered flows through the inlet port 14 into the compartment 15 and through the filter wall 11 into the compartment 16. A lower passageway 17, not in communication with the compartment 15, extends from the compartment 16 to the short pipe 18 which communicates with the upper end of the pipe 19 suspended from the bottom 20 of the upper tank 10. At the lower end of the pipe 19 is located a horizontal, perforated, distributing pipe 21 at the lower end of the supplemental tank 22 within the large tank 7. The upper tank 10, together with the mechanism within the same and together with the pipes 19 and 21 suspended therefrom, are detachable from the tanks 7 and 22. The upper tank 10 may be provided in the compartment 15 with a heating pipe 23 through which hot water may be circulated by means of the connections 24, 24, shown in Fig. 2.

At one corner of the upper tank 10 is secured an overflow pipe 25 which is supported on the bottom 20 and is open at both ends. The height of the pipe 25 is slightly less than the height of the filter wall 11. If the filter wall becomes so clogged with dirt as to retard free flow, or if the oil introduced through the inlet opening 14 comes in too rapidly, the depth of the oil in the compartment 15 will be limited by the overflow pipe 25. The overflowing oil will flow into the compartment 26 in the auxiliary tank 22. A pipe 27 leads from the compartment 26 to the elongated trough 28. An overflow pipe 29 is connected to one end of the trough 28 and is associated with an overflow alarm diagrammatically illustrated at 30 in Fig. 2. A pipe leads from the bottom of the auxiliary tank 22 outside of the casing or cabinet 7 upwardly to a water overflow pipe 31 in the water separating chamber 32, the upper outlet of the water overflow pipe 31 being below the level of the upper edge of the trough 33. An overflow pipe 34 leads from the bottom of the water separating chamber 32.

When used oil is introduced into the upper cabinet or tank 10 and flows into the auxiliary tank 22, the water will become separated and flow out of the tank 32, whereas the oil will float to the top in the auxiliary tank 22 and flow into the trough 33 over the longitudinal weir 35. A plurality of hinged pipes 36 are connected to the forward bottom portion of the trough 33 in position to be swung so as to lead the oil from the trough 33 into the filter elements. The hinged pipes 36 may be moved to the dotted line position shown at 36' in Fig. 1 to facilitate renewal of the filter elements.

The filter element comprises an elongated open frame 37, preferably of metal. A filter bag 38 is adapted to be suspended from the elongated open frame 37. Such filter bag is restrained from bulging by a plurality of spaced-apart U-shaped metal loops or slings 39 secured at their upper ends to the lateral lugs 40, the upper surfaces of which are flush with the upper surface of the frame 37. The U-shaped metal loops or slings 39 are preferably made of sufficient strength to be self-supporting so that a plurality may, if desired, be placed side by side on the bottom of a tank and receive sufficient support from said bottom to hold the frames 37 in elevated positions. For this purpose, the loops may be made horizontal at the bottom, as shown in Fig. 3ª, where the loop is designated 39'.

The upper ends of the U-shaped slings 39 may be detachably connected to the frame 37 by means of nuts, one below each lug 40 and another above the same, but I prefer to permanently secure the upper ends of the loops 39 to the frame so as to provide an upper surface which will be smooth and free from projections which might interfere with the cleaning operations of the filter bag. The loops or slings 39, near their upper ends, may be swaged or flattened, as indicated at 42 in Fig. 4, so as to provide lateral abutments to engage the lower side of the lug 40. The projecting end of the rod may be peaned over or riveted, as shown at 43 in Fig. 4. By means of this construction, the metal loops are permanently secured to the frame 37 and the peaned over or rivet heads 43 will afford a smooth, continuous upper surface for the frame 37 so that when the filter bag is turned inside out for cleaning purposes and then replaced within the metal loops, no projections will catch on the filter bag during such operations. Instead of the flattened portion 42 to provide lateral abutments, two ears may be swaged on diametrically opposite sides of the rods to provide such abutments.

Extending around the frame 37 is an endless groove 44 to form key-ways on the lateral sides of the frame 37. A key 45, shown in Fig. 5, is adapted to be grasped by the handle 46 and forced between the sides of the cloth bag 38 and the vertical rods of the metal loops, as may readily be seen by referring to Figs. 1 and 3. That is to say, after the open end of the bag 38 has been pulled up over the grooves 44 of the open frame 37, two keys 45 are forced along the grooves on opposite sides of the frame, the keys engaging the adjacent rods of the metal loops to force the bag firmly into the longitudinal grooves 44. Before the bag is locked to the frame by means of the keys, a wire or string 47 may be used to tie the upper edge portion of the bag in the groove 44 so as to hold the bag over the lower open end of the frame while the keys are being forced along the inner sides of the rods of the metal loops adjacent the grooves. The metal loops being stiff and strong will enable the keys to maintain the bag firmly in contact with the grooves 44.

The frame 37 comprises two longitudinal sides 48, 48, and a curved portion 49 at one end and a square portion 50 at the other end. The elongated opening through the frame 37 is shown at 51 in Fig. 2. Such elongated opening extends from one end of the frame to the other so that when the pipe 36 is in a horizontal position, it may direct oil from the weir trough 33 into the filter bag.

A hooked projecting bracket 52 is located at one end of the frame 37 and is adapted to rest on or hook over a shelf 53 as shown in Fig. 1. The other end of the frame 37 is provided with a spout 54 above a hooked bracket 55 which is adapted to extend over the front edge of the overflow trough 28.

The frame 37 together with the metal loops 39 and the bag 38 securely keyed to the frame, when in the cabinet 7, are supported in horizontal position, the brackets 52 resting on the longitudinal shelf 53 which is secured to the inner side of the front wall of the cabinet or tank 7. The spout 54 is located at the top edge of the general overflow trough 28. It will thus be seen that the spout 54 is adapted to direct oil that may overflow from the bag 38 into the general overflow trough 28, as well as to co-operate with the bracket 52 in supporting the filter element comprising the frame 37, the metal loops and the bag.

In an automatic lubricating system, it may be undesirable, in some instances, to shut off the flow of oil entirely or to decrease the flow of oil too much by reason of too many of the filter bags becoming clogged with impurities and not being attended to immediately. I therefore provide an overflow opening in one side of the frame 37, as indicated at 56 in Fig. 4. Such overflow opening is at such an elevation that it will not interfere with the simultaneous overflow from the spout 54 to effect the operation of the overflow alarm. Such overflow opening 56 protects the filtering apparatus in its place in an automatic lubricating system so that the latter may continue in operation although the engineer or attendant may be neglectful in attending to the renewal of a filter element when the signal is given that it requires attention. Such overflow opening in the side of the frame 37 may, if desired, be located in the position indicated at 56' in Fig. 1.

In order that the filter elements may be placed side by side and easily positioned so as to have the spouts 54 register with the inflow pipes 36, some of the lugs 40 may have flat lateral surfaces, as indicated at 40' in Fig. 2, and additional intermediate lugs having flat lateral surfaces, may be added, as shown at 57 in Figs. 2 and 4. As shown in Fig. 2, the lugs 40' and 57 may abut against the inner wall of the tank or cabinet 7 and the lugs on the other side may abut against similar lugs on the next adjacent filter element frame. In this manner, the metal loops and filter bags may be properly spaced from each other and the filter element frames held in adjusted position so as to be in proper registry with the inflow pipes 36.

If it should happen that the filtered oil fills the tank or cabinet 7 so full that the oil approaches the upper open sides of the filter elements, such oil in the tank 7 will overflow into the general overflow trough 28 and any overflow, whether of this nature or from the filted bags, will cause the operation of the alarm 30.

When the filter bags become filled with impurities extracted from the oil, the pipes 36 may be moved to the position indicated at 36' in Fig. 1 and the filter elements removed individually by lifting them manually from the tank 7. This may easily be done by grasping end portions of the frame 37 between the projecting and abutting lugs 40' and 57. It should be particularly understood that for the purpose of cleaning the bags, they need not be removed from the frames. While the keys remain in place, the bag is turned inside out by extending the same through the elongated opening 51. While holding the filter element upside down as shown in Fig. 6, by grasping the metal loops 39 with one hand, the other hand may be used to clean the inside of the bag which has been extended through the opening 51.

This may be done in a suitable receptacle such as a pail having cleaning fluid therein for such purpose. The bags may thus be cleaned many times without removing them from the frames and they need not be removed from the frames until they are worn out. After the bag has been turned inside out, cleaned, and put back into the metal loops 39, the filter element may be put back into the tank 7 manually and the pipe 36 moved from the position 36' to the horizontal position so as to restore the operativeness of the replaced filter element. It should be particularly noted that the inside or opening 51 of the frame 37, as well as the upper surface of the frame 37, is entirely free from any projections which would interfere with the free movement of the filter bag, either while being turned inside out or while being restored to its normal position within the loops 39. For this purpose, it is preferable to provide the rounded surfaces 43 at the upper ends of the rods 39, as explained above.

While I have shown oil cleaning apparatus of the type disclosed in my co-pending application, Serial No. 723,158, it should be understood that the filter elements herein disclosed and their arrangement may have a general application and be used for filtering any desirable liquid other than oil.

Obviously those skilled in the art may make various changes in the details and arrangements of parts without departing from the spirit and scope of the invention as defined by the claims herewith appended, and it is therefore desired not to be restricted to the precise construction herein disclosed.

Having thus fully described and shown an embodiment of my invention, what I desire to be secured by Letters Patent of the United States is:—

1. A filter device comprising a frame, a bag supported by said frame, and protecting loops for the bag secured to said frame to support the same in a position elevated from the surface on which the loops rest with the bag suspended from said frame.

2. In a filtering apparatus, the combination with a frame having a groove therein, a fixed projection on said frame, a filter bag having a portion thereof interposed between said projection and said groove, and a means cooperating with said projection to force a portion of said filter bag into said groove and hold said bag releasably in position on said frame.

3. A filtering apparatus comprising a filter bag frame, a filter bag, a groove in said frame, and a substantially rigid rod for holding a portion of said bag in said groove, said rod being forced toward said groove by a fixed means on said frame and held in position solely by the friction between said fixed means and said rod and also by the friction between said bag and said rod.

4. A filtering apparatus comprising a frame having an opening therein, grooves in said frame extending along opposite sides of said frame, projections on said frame arranged in opposed relation to said grooves, a filter bag having a portion thereof adapted to be arranged between said projections and said grooves, and rods adapted to be inserted between said projections and said filter bag for holding said portion of said filter bag in said grooves.

5. A filter bag support comprising a frame having an opening therein, grooves in said frame adjacent said opening, a filter bag having an open mouth adapted to be placed in position relative to said frame so that said opening in said frame communicates with the open mouth of said filter bag, fixed abutments on said frame and substantially rigid rods co-operating said fixed abutments for holding said filter bag in position.

6. A filter element comprising a frame, an abutment arranged in opposed relation to said frame, a bag adapted to be held on said frame by means of a rod co-operating with said fixed abutment, said frame having an opening adapted to communnicate with an opening in said filter bag when said filter bag is in position.

7. A filtering device comprising an elongated frame having grooves in opposite sides thereof, an open-mouthed filter bag adapted to be placed over an opening in said elongated frame so that portions of said filter bag are arranged adjacent said grooves, and fastening means shaped substantially the same as said grooves adapted to engage said filter bag and force the portions of said filter bag adjacent said grooves into said grooves and thereby prevent removal of said filter bag from said frame, said fastening means being frictionally held in operative position so as to be readily attached.

8. A filter device comprising a frame, an opening in said frame, a filter bag adapted to be suspended from said frame and having an opening communicating with the opening in said frame, looped members suspended from said frame and adapted to extend around said filter bag, said looped members being adapted to prevent excessive outward movement of the walls of said filter bag, said filter bag being free to be removed without disturbing said looped member.

9. A filter device comprising a frame, a plurality of U-shaped members suspended from said frame, a filter bag suspended from said frame and within said members, said members being adapted to prevent excessive movement of the walls of said filter bag in a direction towards that side of the filter bag through which the filtered liquid escapes, and means for detachably securing said filter bag in place on said frame without affecting said U-shaped members.

10. A filtering apparatus comprising a frame, a plurality of loops rigidly connected to said frame, a filter element supported on said frame and suspended within said loops, said loops being constructed to support said frame in upright position on a horizontal supporting surface.

11. A filtering apparatus comprising a frame having an elongated opening therein, a filter bag having the mouth thereof fitted over said opening, and a plurality of loops secured to said frame and extending around said filter bag and normally free to move towards and away from said loops.

12. A filtering apparatus comprising a frame having an elongated opening therein, a filter bag having the open mouth thereof secured to said frame so that the open mouth of said filter bag communicates with said opening in said frame, and a plurality of spaced projections on said frame co-operating with similar projections on an adjacent portion of said frame for holding said filter bag in position.

13. A filtering apparatus comprising a frame having an opening therein, an open-mouthed filter bag arranged with its open mouth in communication with the opening in said frame, grooves along opposite sides of said frame and adjacent that portion of said filter bag which forms the mouth thereof, a key for each groove, and mechanism attached to said frame and spaced therefrom adapted to serve as abutments for forcing said keys toward said grooves to thereby secure said bag to said frame.

14. A filtering apparatus comprising a frame, a bag having its open mouth drawn over the bottom of said frame so that said open mouth communicates with an opening in said frame, loops rigidly secured to said frame and projecting around said bag, said loops having portions thereof arranged in spaced relation to a portion of said frame, said last-mentioned portion of said frame having a groove therein, and a key adapted to be interposed between said loops and said groove for holding said filter bag in position on said frame.

15. A filter device comprising a frame having an unobstructed opening therethrough, a bag having an open mouth adapted to fit over a portion of said frame, loops extending around said bag and secured to said frame, and key mechanism co-operating with said frame and portions of said loops to hold said filter bag in position on said frame.

16. A filtering apparatus comprising an elongated frame having an overflow passageway at one end thereof, supporting means at the opposite ends of said frame, rigid loops secured to said frame, a filter bag arranged within said loops and having an open mouth adapted to be fitted over a portion of said frame and in communication with an opening in said frame, and keys co-operating with said frame and said loops for holding said bag in adjusted position on said frame, said opening in said frame being unobstructed so as to permit the filter bag to be drawn through said opening to thereby turn said bag inside out without the necessity of removing said bag from said frame.

In testimony whereof I have signed my name to this specification on this 15th day of October, A. D. 1926.

WILLIAM W. NUGENT.